United States Patent
Hubbard et al.

(10) Patent No.: US 6,957,137 B2
(45) Date of Patent: Oct. 18, 2005

(54) REAL-TIME OPERATING PARAMETER SELECTION IN A VEHICULAR TRANSMISSION

(75) Inventors: Gregory A. Hubbard, Brighton, MI (US); Anthony H. Heap, Indianapolis, IN (US); William R. Cawthorne, Milford, MI (US)

(73) Assignee: General Motors Corporation, Detroit, MI (US)

( * ) Notice: Subject to any disclaimer, the term of this patent is extended or adjusted under 35 U.S.C. 154(b) by 63 days.

(21) Appl. No.: 10/686,034

(22) Filed: Oct. 14, 2003

(65) Prior Publication Data

US 2005/0080538 A1 Apr. 14, 2005

(51) Int. Cl.[7] .............................. B60K 41/00; B60K 6/02
(52) U.S. Cl. .................... 701/54; 701/55; 180/65.2; 180/65.8
(58) Field of Search ............................. 701/54, 58, 22, 701/55, 56; 180/65.2, 65.8, 65.6; 477/107, 110

(56) References Cited

U.S. PATENT DOCUMENTS

| 5,910,722 | A | | 6/1999 | Lyons et al. |
| 5,931,757 | A | | 8/1999 | Schmidt |
| 6,154,701 | A | * | 11/2000 | Loffler et al. ............... 701/54 |
| 6,449,537 | B1 | | 9/2002 | Phillips et al. |
| 6,629,027 | B2 | * | 9/2003 | Yamaguchi et al. .......... 701/22 |
| 6,732,526 | B2 | * | 5/2004 | Minagawa et al. .......... 60/706 |
| 6,751,960 | B2 | * | 6/2004 | Arimitsu et al. ............. 60/706 |
| 2002/0062183 | A1 | * | 5/2002 | Yamaguchi et al. .......... 701/22 |

OTHER PUBLICATIONS

Brace et al.; Operating Point Optimser for Integrated Diesel/CVT Powertrain; Application of Powertrain and Fuel Technologies to Meet Emissions Standards for the 21st Century; Jun. 1996.*

* cited by examiner

Primary Examiner—Michael J. Zanelli
(74) Attorney, Agent, or Firm—Christopher DeVries; Leslie C. Hodges

(57) ABSTRACT

Preferred operating points for a vehicle powertrain including an engine and a transmission are determined in accordance with a comprehensive operational mapping of input and output conditions and corresponding aggregate system losses corresponding to engine and transmission losses. In a hybrid transmission application, additional losses from motors and batteries are aggregated into the system losses and battery constraints are considered in determining preferred operating points. Preferred operating points are provided in one or more sets of minimized data for on-vehicle implementation.

14 Claims, 10 Drawing Sheets

REAL-TIME OPERATING PARAMETER SELECTION IN A VEHICULAR TRANSMISSION

CROSS REFERENCE TO RELATED APPLICATIONS

This invention is related to commonly assigned and co-pending U.S. Ser. No. 10/686,508.

TECHNICAL FIELD

The present invention is related to control of a vehicular powertrain. More particularly, the invention is concerned with on-vehicle determinations of preferred operating points for the powertrain.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

It is known to select engine power from the road-load power required plus an additional quantity of engine power based on the energy storage system's (e.g. battery's) state-of-charge. Following selection of engine power, the engine's optimal fuel economy or optimal emissions map or a combination thereof may be used to select the engine's torque/speed operating point. The battery power effected is that which is required, in combination with the engine power, to meet the road-load power requirements and to compensate for power losses within the system.

Known systems do not optimize the power flow of all the propulsion system components. Typically, only the engine operation is optimized. The prior art does not weigh additional factors such as other system mechanical and electrical losses and battery usage factors in selecting the overall system's preferred operating point.

SUMMARY OF THE INVENTION

The invention overcomes the deficiencies of the prior art by considering the system as a whole in determining operating conditions.

In accordance with one aspect of the present invention preferred operation of the system is achieved in accordance with considering the system as a whole in determining operating conditions.

In accordance with another aspect of the present invention optimum system operating points are determined through comprehensive consideration of engine, mechanical and electrical based contributory system losses.

In accordance with yet another aspect of the present invention optimum system operating points are selected in an on-vehicle powertrain control that utilizes one or more minimized sets of data from the comprehensive operating space meeting predetermined conditions, limitations or constraints.

DESCRIPTION OF THE PREFERRED EMBODIMENT

Figure 1:
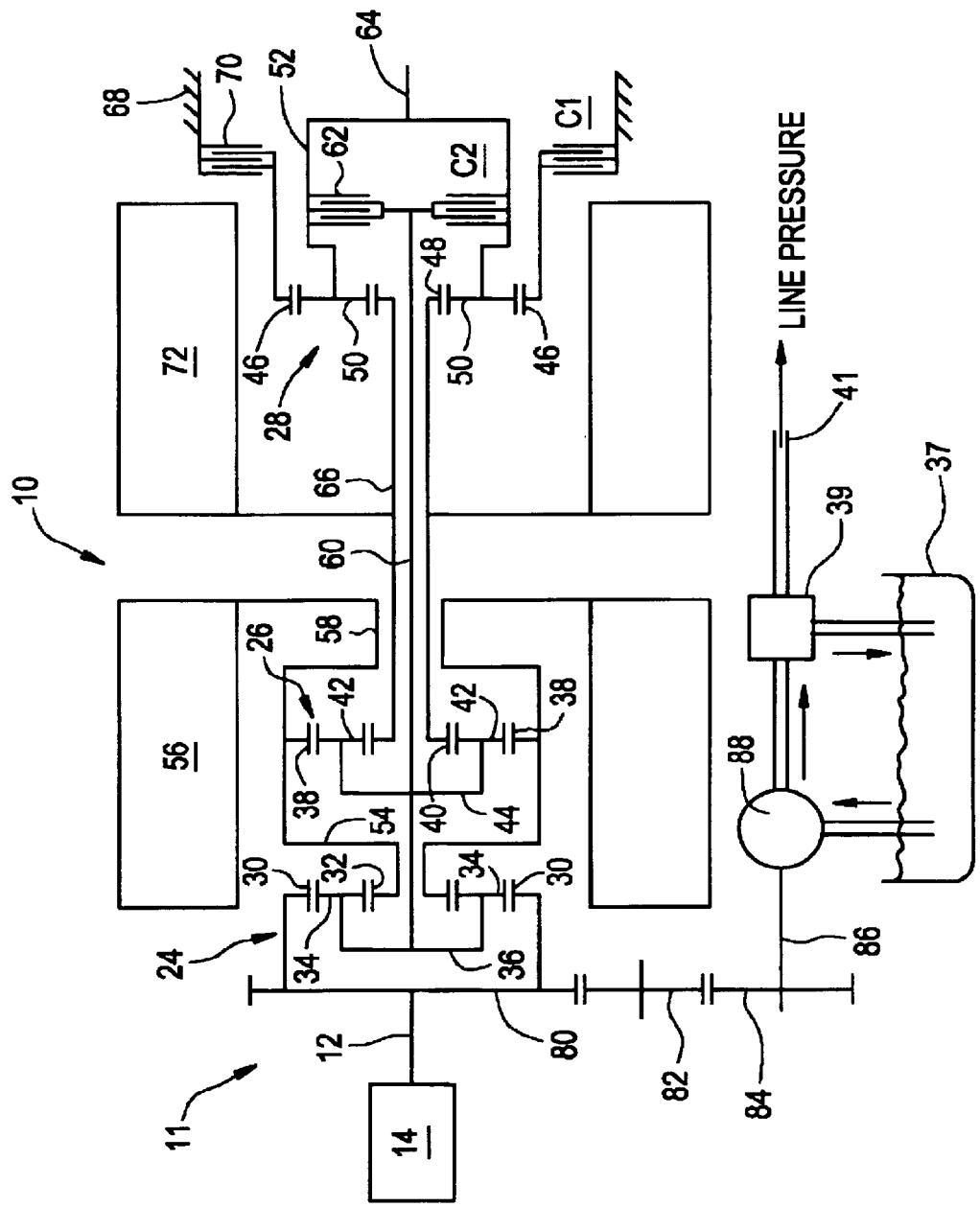
FIG. 1 is a mechanical hardware schematic representation of one preferred form of a two-mode, compound-split, electrically variable transmission particularly suited to the implementation of the present invention.
Figure 2:
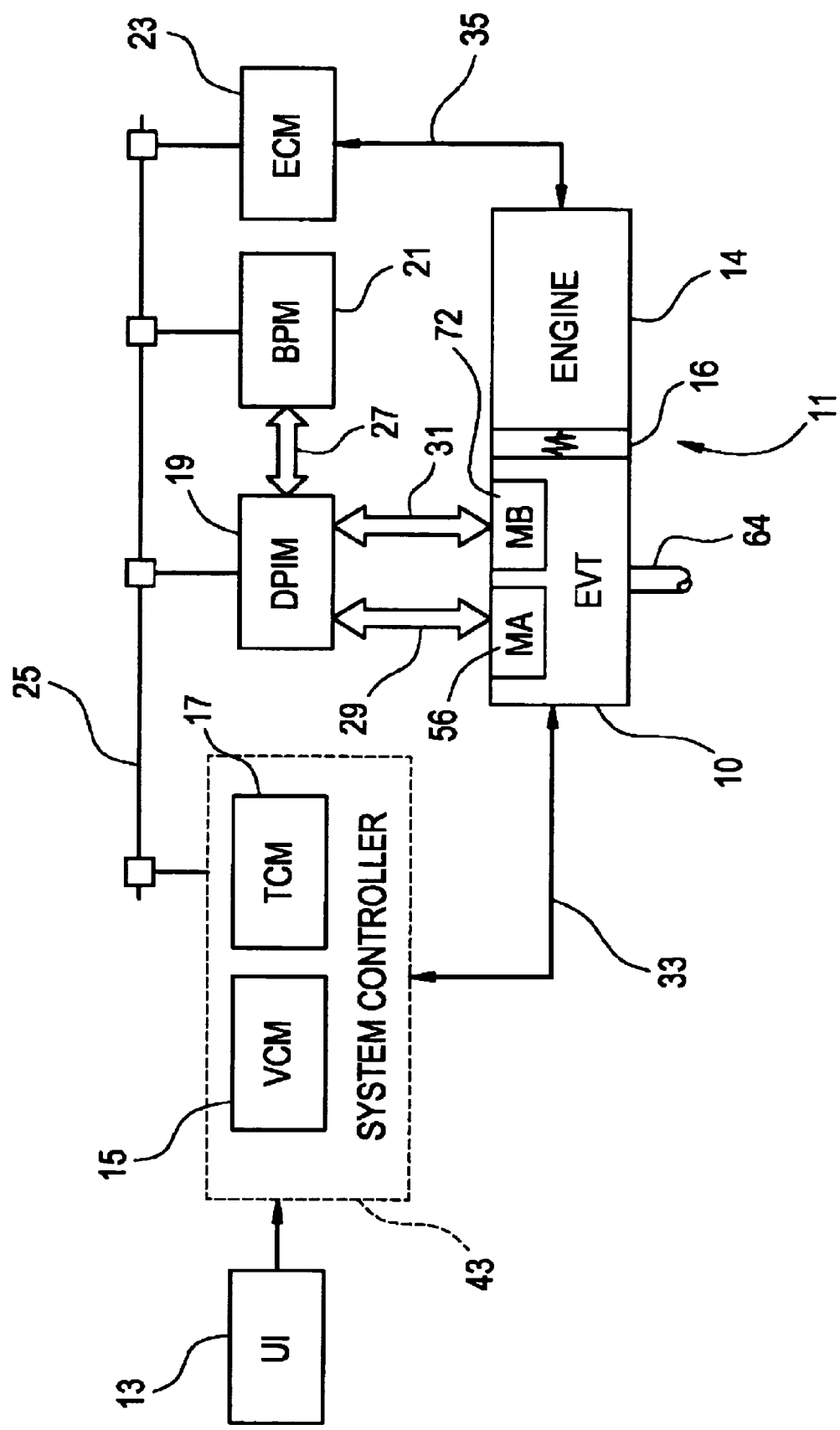
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bidirectional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bidirectional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, MA speed Na and MB speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
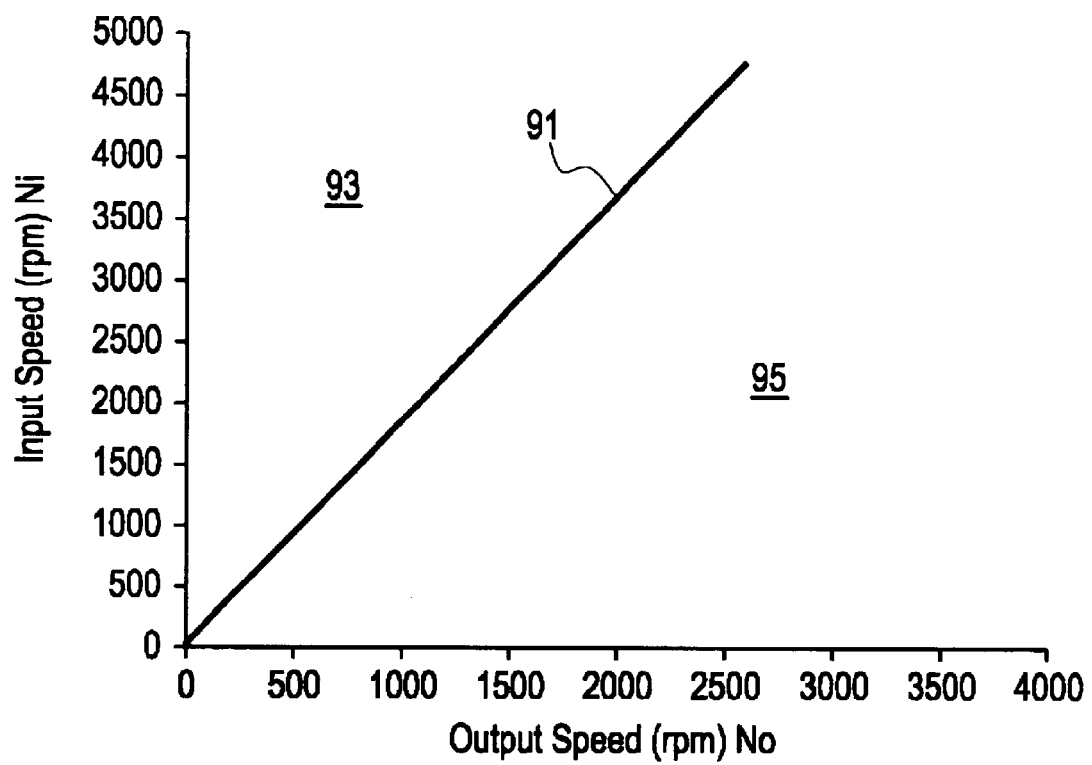
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Various tasks that are to be performed in practicing the present invention are, at this time, preferred to be implemented off-vehicle whereas certain other tasks are preferred or necessarily implemented on-vehicle. Such preferences will be set forth in the following description where appropriate. However, all of the tasks of the present invention may be performed on-vehicle and it is considered that such implementation be within the scope of the present invention regardless of the present preferences as set forth herein.

Consistent with the objectives of establishing system comprehensive preferred operating conditions for a hybrid vehicle, a comprehensive operating space is defined in a plurality of dimensions corresponding to a plurality of transmission and engine operating parameters which are of interest. For purposes of the present preferred example, those parameters include input/engine speed and torque (Ni, Ti), output speed and torque (No, To) and modes of operation (M1, M2).

In the present exemplary embodiment of the invention, an objective is to determine various power loss data for the system as a whole and battery power usage data with correlation to the operating space comprising input and output torque and speed in the various operating modes of the powertrain. It follows then that in visualizing correlation of such operating conditions to such determined data that the operating conditions be generally designated as inputs or independent variables in a matrix or operating space and the determined data be generally designated as outputs or dependent variables. Such input/output arrangement may be better visualized with reference to the top portion 110 of FIG. 4 wherein the determinative independent variables are in a first set of columns labeled "inputs" and the determined dependent variables are in a second set of columns labeled "outputs."

While any variety of rearrangement or transformation of the variables may be accomplished in accordance with a particular usage or reference objective, a presently preferred arrangement for storage is one which is efficiently indexable by certain uncontrolled or indirectly controlled ones of the parameters of the powertrain which serve as independent variables in their own right in a preferred control for the powertrain. In accordance with such a preferred control, No and To are utilized as independent variables in the determination of preferred operating points for the input torque and speed which will allow for torque command generation for the engine and speed control of the transmission via transmission electric motor torque control. Such torque commanded operation of the engine is generally well known in the arena of torque based engine controls and is not further detailed herein. An exemplary speed control for a hybrid transmission is described in detail in commonly assigned and co-pending U.S. Ser. No. 10/686,511 which is incorporated herein by reference. Hence, a logical and preferred rearrangement or transformation of the variable is better visualized with reference to the bottom portion 112 of FIG. 4 wherein the independent variables are in a first set of columns labeled "inputs" and the dependent variables are in a second set of columns labeled "outputs."

Figure 5:
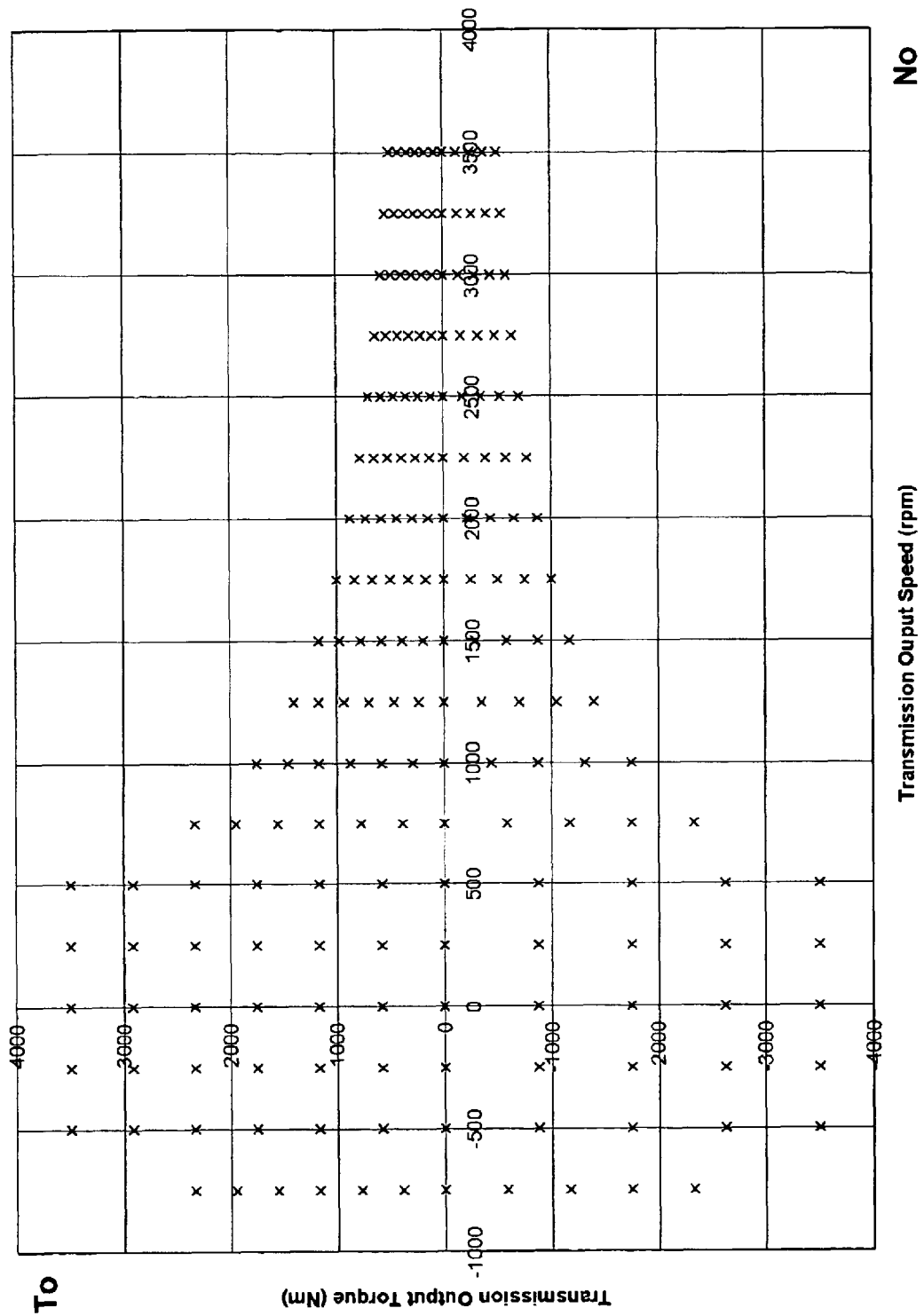
FIG. 5 is a graphical representation of a two-dimensional output operating region in output torque and output speed for the electrically variable transmission disclosed herein.

With the known system capabilities of output torque and output speed (e.g. maximum output torque 3500 Nm, Maximum Output Speed 3500 rpm and Maximum Output Power 183 kW) a comprehensive, two-dimensional output operating space, region or plane of interest, No/To, is constructed as shown in FIG. 5. Alternative regions can be defined and utilized. For example, sub-regions of the comprehensive No/To region shown in FIG. 5 could be defined where only partial processing of a comprehensive space is desired or advantageous. For example, where processing, throughput, or memory limitations dictate a smaller space consideration for an on-vehicle implementation of these front-end steps, it may be that a smaller sub-space or region is selected for performing the steps to follow. Points are scaled to the power limit of the vehicle since the maximum output torque drops as output speed increases so that resolution for the output space is improved.

Figure 6:
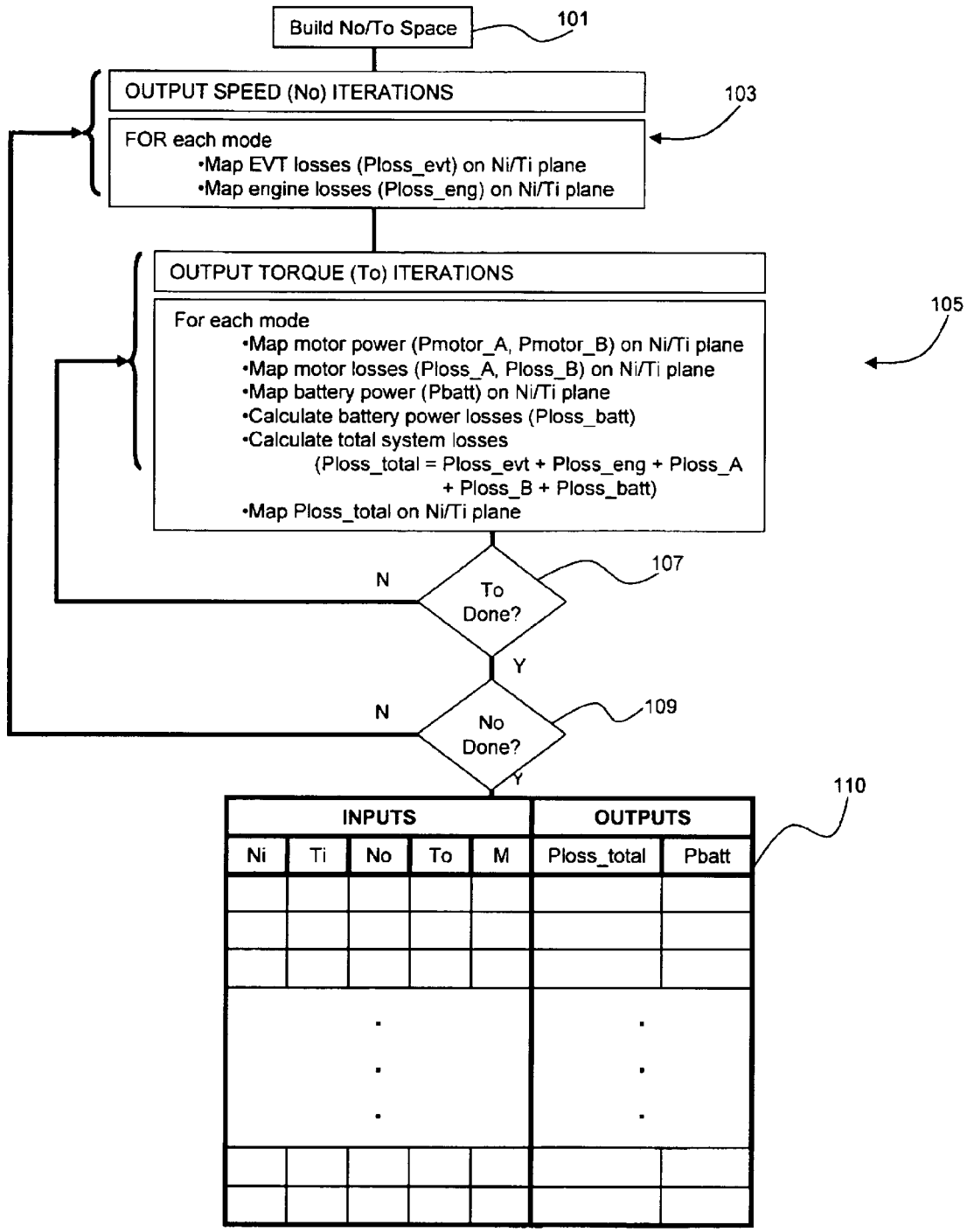
FIG. 6 is a preferred flow of steps utilized in mapping of operating space data in accordance with the present invention.

FIG. 6 shows a preferred flow of steps utilized in efficiently determining battery power usage and system power loss and mapping them to operating space in accordance with the present invention. With reference to the figure, the region set forth in FIG. 5 is first established or defined at 101. The process at 103 iterates through the values of No in the output operating region No/To and mechanical losses are mapped into a two-dimensional, input operating space, region or plane of interest, Ni/Ti. The Ni/Ti region as referenced herein is also limited to a space or region of interest much in the same manner as the output region described with respect to FIG. 5. As such, the Ni/Ti region of interest may take the form of a comprehensive region (i.e. limited by known system capabilities) or a more limited region of interest therein. Included in mechanical losses as used herein are EVT losses such as hydraulic pumping loss, spin loss, clutch drag, etc., and engine losses associated with operating away from the most efficient Brake Specific Fuel Consumption (BSFC) point.

The EVT losses (Ploss_evt) are provided for reference by the routine in pre-stored table format indexed by Ni and No, having been empirically derived from conventional dynamometer testing of the EVT unit throughout its various modes of operation and within the effective gear ratio ranges associated therewith. From the tabulated and referenced EVT losses, Ploss_evt are mapped in the Ni/Ti region for the present iteration in No.

The power losses for the engine also are determined in accordance with pre-stored tabulated data. The engine power losses are provided for reference by the routine in pre-stored table format indexed by Ti and Ni. The preferred manner of generating such tables is through application of a loss equation as follows for calculation of engine power loss:

$$P_{loss\_eng} = \eta_{MAX} LHV(kJ/g) Q_{FUEL}(g/s) - P_{OUT}$$

where $\eta_{MAX}$ is the engines maximum efficiency,
LHV (kJ/g) is the fuel's lower heating value,
$Q_{FUEL}$ (g/s) is the fuel flow rate at operational conditions, and
$P_{OUT}$ is the engine mechanical shaft output power at operational conditions.

Conventional dynamometer testing is employed to establish the baseline $\eta_{MAX}$ and in the gathering and tabulation of the relative engine losses. From the tabulated and referenced engine losses, Ploss_eng are mapped in the Ni/Ti region for the present iteration in No.

The process at 105 iterates through the values of To in the region of interest and motor power and aggregate motor and power electronics losses are mapped in the Ni/Ti region. Motor power is determined in accordance with EVT torque and speed models derived from Newtonian based physical modeling for rotating bodies (e.g. free body diagrams) for the various modes of the EVT. The matrix equations for motor torque are derived and placed into the following form for calculation of Ta and Tb from Ti and To for the present iteration in No/To:

$$\begin{bmatrix} Ta \\ Tb \end{bmatrix} = \begin{bmatrix} K_{11} & K_{12} \\ K_{21} & K_{22} \end{bmatrix} \begin{bmatrix} Ti \\ To \end{bmatrix}$$

where Ta is motor A torque,
Tb is motor B torque,
Ti is EVT input torque,
To is EVT output torque, and
Kn are system constants including reflected gear ratios and inertias.

Likewise, the matrix equations for motor speeds are derived and placed into the following form for calculation of Na and Nb from Ni and No for the present iteration in No/To:

$$\begin{bmatrix} Na \\ Nb \end{bmatrix} = \begin{bmatrix} K_{11} & K_{12} \\ K_{21} & K_{22} \end{bmatrix} \begin{bmatrix} Ni \\ No \end{bmatrix}$$

where Na is motor A speed,
Nb is motor B speed,
Ni is EVT inout speed,
No is EVT output speed, and
Kn are system constants including reflected gear ratios.

From the matrix equations generating torques and speed, motor power is derived as follows:

$$P_{motor\_A} = Ta * Na, \text{ and}$$

$$P_{motor\_B} = Tb * Nb$$

Motor power, Pmotor_A and Pmotor_B, are mapped in the Ni/Ti region for the present iteration in No/To.

Figure 7:
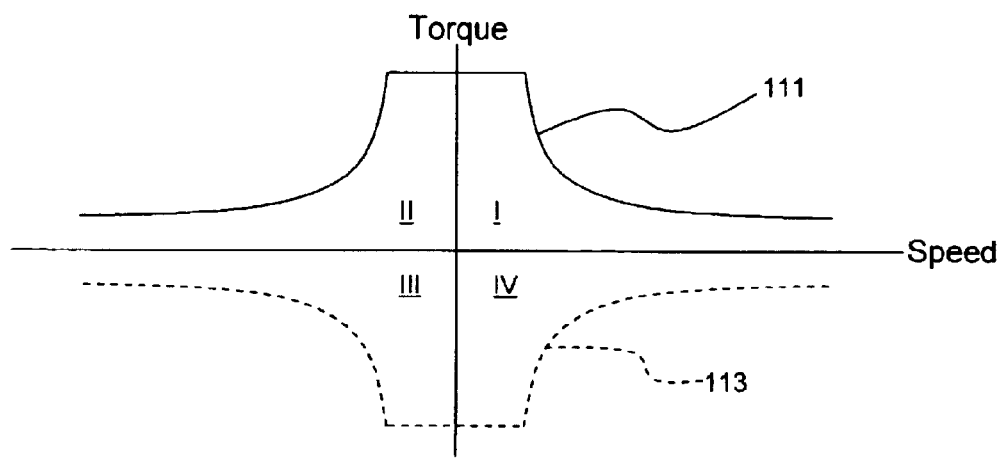
FIG. 7 is a graphical depiction of empirically determined motor torque vs. speed characteristic data utilized in the mapping of operating space data in accordance with the present invention.

Continuing the iteration through the values of To in the region of interest, aggregate motor and power electronics losses ("motor losses") are mapped in the Ni/Ti region. The motor losses are provided for reference by the routine in pre-stored table format indexed by the motor torque and motor speed, having been empirically derived from conventional dynamometer testing of the combined motor and power electronics (e.g. power inverter). An exemplary representation of such characteristic motor torque vs. speed data is illustrated in FIG. 7. The tabulated data is referenced by the motor torque (Ta, Tb) and motor speed (Na, Nb). The difference between the electrical power input (Ia*V and Ib*V) and the motor shaft mechanical power output (Ta*Na and Tb*Nb) equates to the motor power loss (Ploss_A, Ploss_B) as follows:

$$Ploss\_A = Ia*V - Pmotor\_A, \text{ and}$$

$$Ploss\_B = Ib*V - Pmotor\_B$$

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 111 whereas quadrants III and IV are shown populated with reflected data 113 therefrom. The referenced motor power losses, Ploss_A and Ploss_B, are thereby mapped in the Ni/Ti region for the present iteration in No/To.

Continuing the iteration through the values of To in the region of interest, the motor power and motor loss mappings in the Ni/Ti region are additively reflected into a mapping of battery power usage in the Ni/Ti region for the present iteration in No/To, wherein battery power usage, Pbatt, is equivalent to the summation of the motor power and motor losses as shown below:

$$Pbatt = Pmotor\_A + Ploss\_A + Pmotor\_B + Ploss\_B$$

Figure 8:
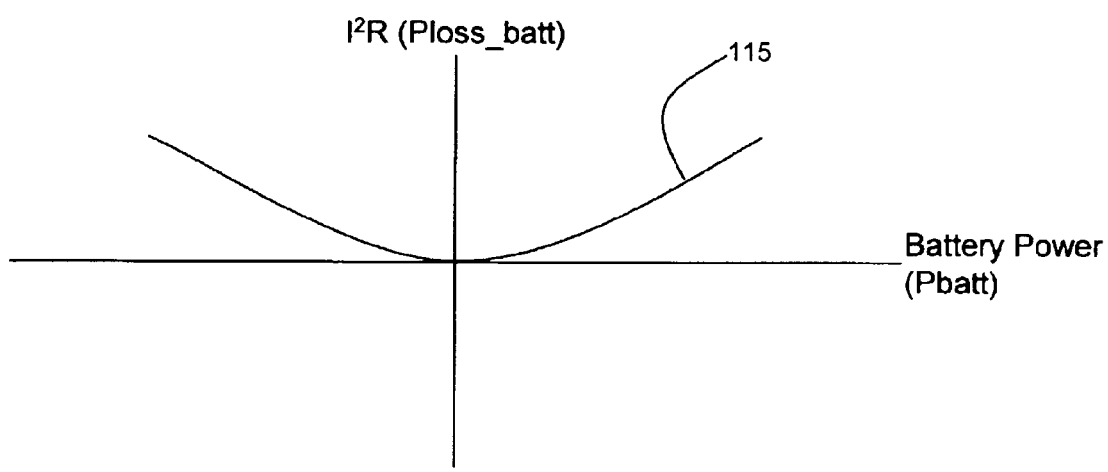
FIG. 8 is a graphical representation of battery power losses vs. battery power characteristic data utilized in the mapping of operating space data in accordance with the present invention.

Finally, the internal power loss for batteries ($I^2R$ losses), is factored into the Ni/Ti mappings to complete the system loss data tabulation. The $I^2R$ losses are provided for reference by the routine in pre-stored table format generated from battery equivalence models and indexed by battery power, Pbatt. An exemplary representation of such characteristic battery power vs. loss data 115 is illustrated in FIG. 8. The $I^2R$ losses corresponding to battery power are reflected as Ploss_batt into the mappings of power loss in the Ni/Ti region for the present iteration in No/To. A total power loss (Ploss_total) in the Ni/Ti region is thus achievable as a function of the system losses as follows:

$$Ploss\_total = Ploss\_evt + Ploss\_eng + Ploss\_A + Ploss\_B + Ploss\_batt$$

From a processing standpoint, the output torque To iterations are performed within the output speed No iterations. Therefore, the output torque iterations are shown nested with a return query at 107 to provide exhaustion of all output torque iterations within a single output speed iteration. Similarly, a return query 109 provides for return to output speed iterations until exhausted, whereafter the present iterative processing covering the entire No/of region of interest is complete.

Figure 4:
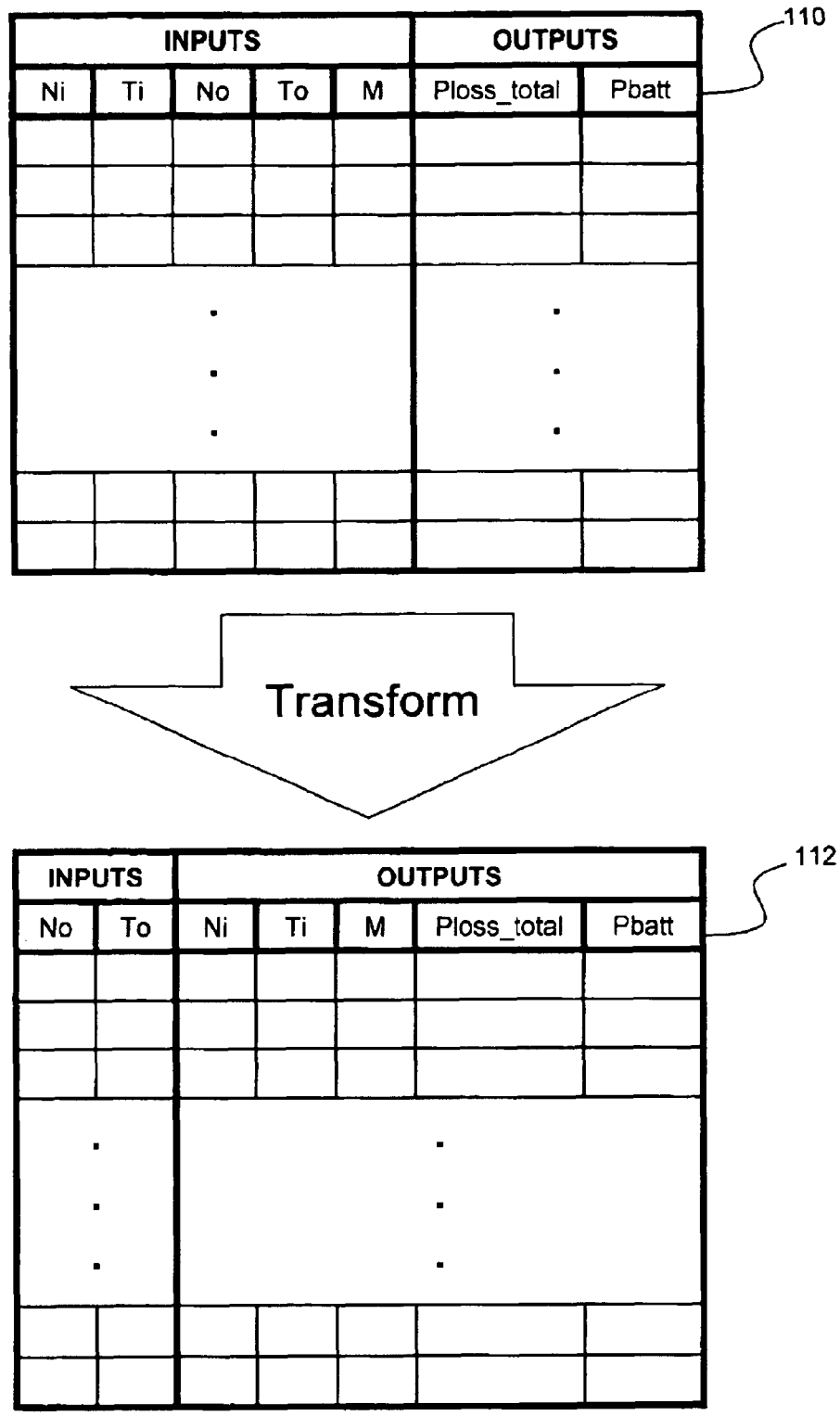
FIG. 4 is a pictorial representation of a predetermined set of powertrain operating parameters comprising an operating space for the powertrain adapted for and organized in structures conducive to deterministic data mapping and prospective control reference thereof.
Figure 9:
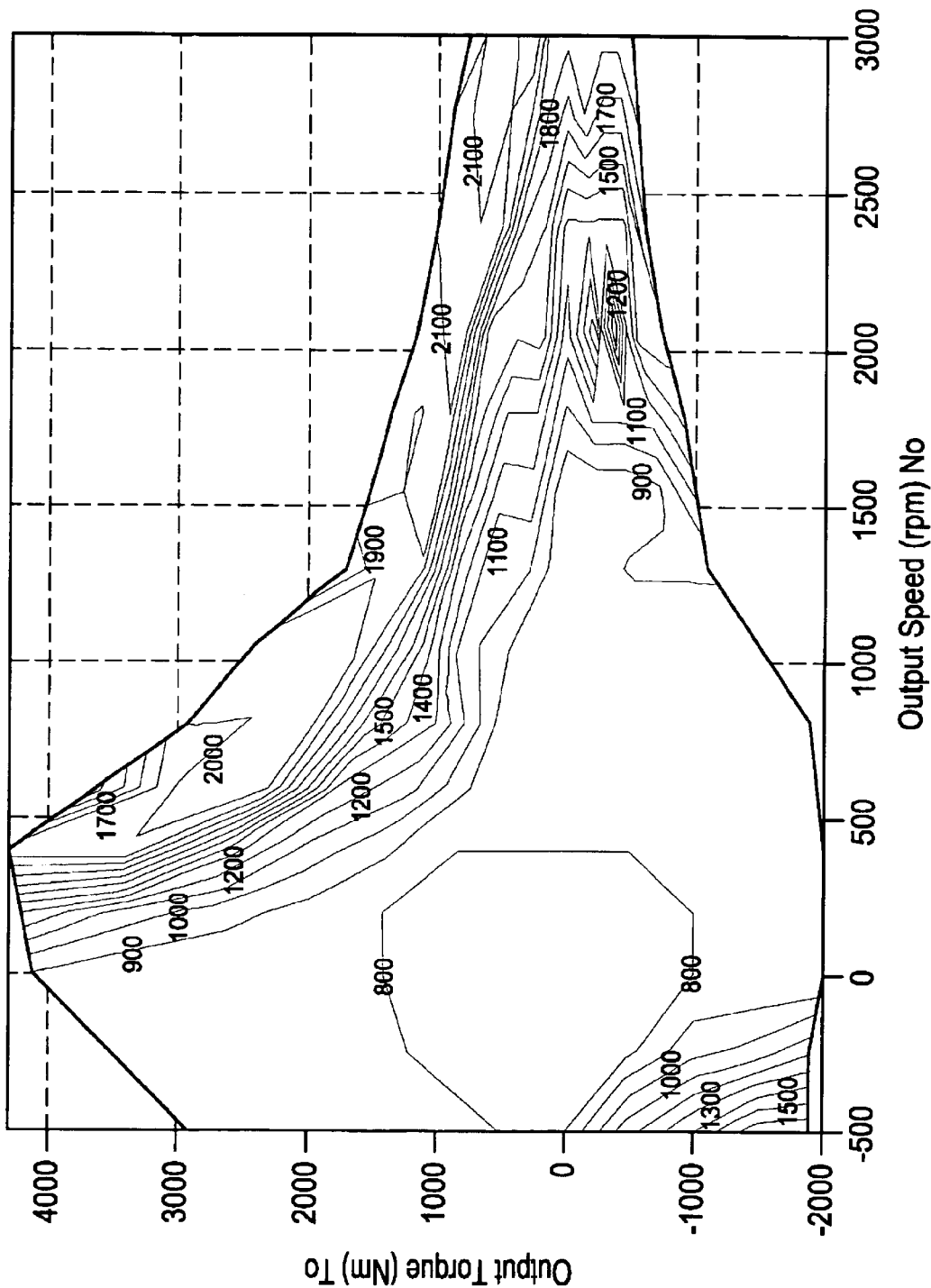
FIG. 9 is a two-dimensional representation of preferred input speed versus the output operating region in output torque and speed for unconstrained battery usage.
Figure 10:
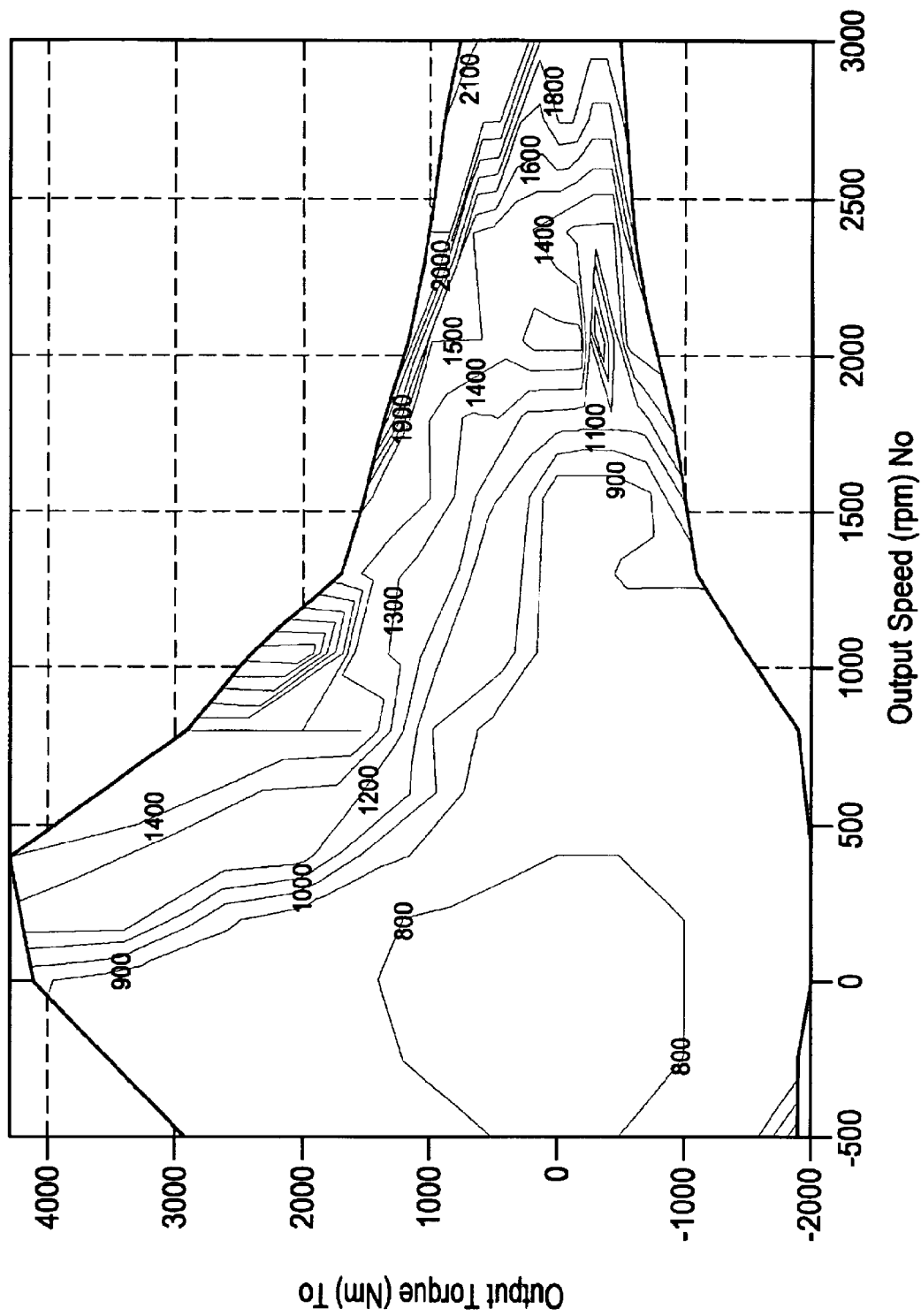
FIG. 10 is a two-dimensional representation of preferred input speed versus the output operating region in output torque and speed for constrained battery usage; and, FIG. 11 is a graphical representation of an on-vehicle methodology of utilizing the preferred input speed operating points from FIGS. 9 and 10 corresponding to constrained and unconstrained battery usage.

At this point a large set of data has been created in an operating space encompassing input and output operating regions (Ni/Fi and No/To) and modes of transmission operation (M), the data also including aggregate system power loss (Ploss_total) and battery power usage (Pbatt). A rearrangement or transformation as previously described with reference to FIG. 4 is performed to tabulate the data in an efficiently utilizable format, such as is shown in the bottom portion 112 of FIG. 4. A minimization of the data is preferably performed to select, for given output operating parameters, only the input operating and mode points (and corresponding Pbatt, Ploss_total data) that return the minimal losses in Ploss_total. An input speed Ni mapped representation of such minimization against output operating parameters No/To is shown in FIG. 9 and provides a first basis for online referencing of input speed for use in an input speed control which would result in optimal system operation if the battery power is unconstrained. FIG. 9 illustrates in two dimensions (No/To) lines of constant input speed (Ni) which are labeled at exemplary points by numbers corresponding to input speeds. An additional minimization of the data is preferably performed to select, for given output operating parameters, only the input operating and mode points (and corresponding Pbatt, Ploss_total data) that return the minimum losses in Ploss_total at zero battery power usage (Pbatt=0). An input speed Ni mapped representation of such minimization against output operating parameters No/To is shown in FIG. 10 and provides a second basis for online referencing of input speed for use in an input speed control which would result in optimal system operation if the battery power is fully constrained (i.e. no battery power expended). FIG. 10 illustrates in two dimensions (No/To) lines of constant input speed (Ni) which are labeled at exemplary points by numbers corresponding to input speeds.

It is noted here that the only combinations of input and output operating parameters that are of practical use are those which are valid combinations. Such valid combinations may be determined empirically or through modeling techniques in advance of the iterative process described for mapping of the operating conditions. Alternatively, invalid combinations may be eliminated from the resultant data maps created in the iterative processing.

The processing to this point in establishing an output operating parameter referenced data space and the pair of minimized input speed mappings corresponding to absolute system power loss (Ploss_total) minimum and local system power loss minimums at battery power (Pbatt) minimums (i.e. no battery power expended) has preferably been performed off vehicle. The pair of minimized mappings is preferably stored in non-volatile memory as part of the system controller 43 and further processing and use thereof as described herein is preferably performed on vehicle.

The minimum Ploss_total map at this juncture may be utilized to directly access input operating speed points (Ni) having the lowest total system losses (Ploss_total) assuming completely unconstrained battery usage for a given output operating condition in No/To, which input operating points may be directly utilized in an input speed control. Similarly, the minimum Pbatt map may be utilized to directly access the input operating speed points (Ni) having the lowest total system losses (Ploss_total) assuming completely constrained battery usage for a given output operating condition in No/To, which input operating points may be utilized in an input speed control. However, the preferred utilization of this pair of battery power unconstrained and battery power constrained maps is to treat each as boundary conditions on a continuum of operating points wherein the degree of the available battery power determines where in the continuum the input operation shall lie. As should be apparent to one skilled in the art, the mappings may be altered or adapted to return both input speed and torque operating points for implementation as a control pair wherein in addition to the described usage of input operating speed points (Ni), input operating torque points (Ti) may be utilized in an engine torque control. Of course, input operating torque points (Ti) may be similarly utilized in an engine torque control apart from any use of input operating speed points (Ni).

As a general consideration, when battery power is limited, it is desirable to specify input operating points that will require less battery power. Hence, in response to such non-exhuastive battery conditions as low battery state of charge, temperature effects and voltage limits which indicate battery power limitations, the bias is desirably toward more constrained battery usage. It follows that battery conditions which indicate no such battery power limitations would be biased toward more unconstrained battery usage. As another general consideration, high vehicle speeds tend to benefit less from motor torque contributions than low vehicle speeds where acceleration demands are greater. Also, batteries tend to deplete rapidly at highway speeds when used for propulsion. Hence, in response to high vehicle speed, the bias will be toward more constrained battery usage. It follows that in response to lower vehicle speeds the bias will be toward more unconstrained battery usage.

Figure 11:
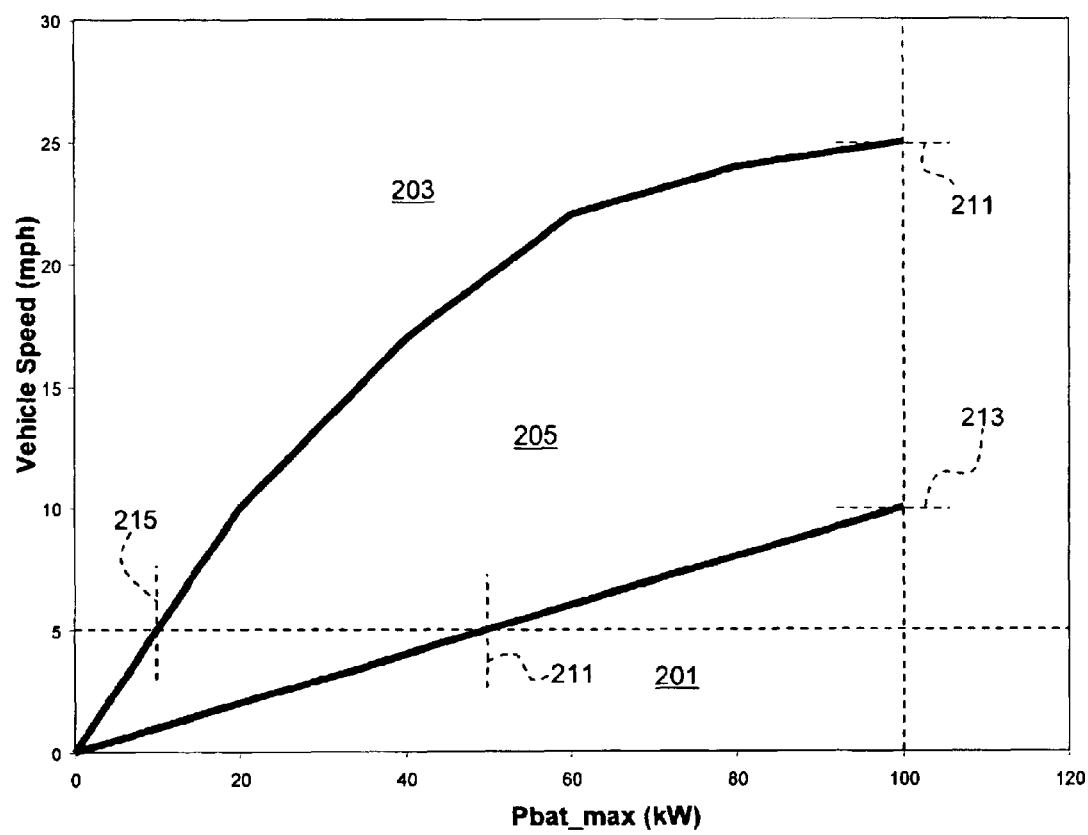

With reference to FIG. 11 and in accordance with these general considerations, a pair of calibration look-up tables defining vehicle speed versus maximum battery power are developed. One table returns vehicle speed transition points for a constrained battery power operation region 203 as a function of maximum battery power, and the other table returns vehicle speed transition points for an unconstrained battery power operation region 201 as a function of maximum battery power. Therebetween these two regions is a blend region 205 further described with reference to examples below. As an example from the illustration of FIG. 11, a maximum battery power in the range of 100 kW would indicate no battery contribution above about 25 mph (211) (i.e. use of minimum Pbatt map), unconstrained battery contribution below about 10 mph (213) (i.e. use of minimum Ploss_total map), and a blended, interpolated or weighted contribution therebetween the two maps for vehicle speeds from about 10 mph to about 25 mph. As another example from the illustration of FIG. 11 of the transition points content of the calibration tables, a vehicle speed in the range of 5 mph would indicate no battery contribution for battery powers less than about 10 kW (215) (i.e. use of minimum Pbatt map), unconstrained battery contribution for battery powers greater than about 50 kW (217) (i.e. use of minimum Ploss_total map), and a blended, interpolated or weighted contribution therebetween the two maps for battery powers between about 10 kW and 50 kW. It is preferred to ensure linearity of response that input speed determination in the blended region 205 be a linear interpolation between the two boundary maps of constrained and unconstrained battery usage. The preceding explanation is provided in accordance with certain exemplary considerations which bias or weigh engine input speed selection toward constrained and unconstrained battery usage maps (minimum Ploss_total map and minimum Pbatt map), however other operating conditions and considerations can provide alternative or supplemental implementations for determining input speed selection in accordance with one, the other or some combined weighting of both battery usage maps. For example constraints to engine speed versus vehicle speed can effect noise abatement and constraints to engine speed acceleration versus either output torque or output speed can effect high quality driveability.

The present invention has been described with respect to a particular exemplary hybrid powertrain arrangement. Those skilled in the art will recognize that other hybrid and conventional powertrain arrangements can be used in conjunction with the present invention. For example, conventional electro-hydraulically controlled, multi-speed transmissions can be used in conjunction with the present invention.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Method for establishing an operating point for a transmission input speed for a powertrain including an engine and a transmission, comprising:

providing a set of preferred operating points for said transmission input speed, said set of preferred operating points being mapped to at least one additional powertrain operating parameter selected from the group consisting of transmission output speed and transmission output torque and combinations thereof;

providing a desired operating point for said at least one additional powertrain operating parameter and referencing said set of preferred operating points with said desired operating point; and, establishing the operating point for said transmission input speed in accordance with referenced preferred operating points from said set of preferred operating points.

2. Method for establishing an operating point for a preselected operating parameter for a powertrain including an engine and a transmission, comprising:

providing a set of preferred operating points for said preselected powertrain operating parameter corresponding to minimum aggregate powertrain losses, said set of preferred operating points being mapped to at least one additional powertrain operating parameter;

providing a desired operating point for said at least one additional powertrain operating parameter and referencing said set of preferred operating points with said desired operating point; and, establishing the operating point for said preselected powertrain operating parameter in accordance with referenced preferred operating points from said set of preferred operating points.

3. The method for establishing an operating point for a preselected powertrain operating parameter as claimed in claim 2 wherein said transmission further includes a motor and a battery and said set of preferred operating points correspond to unconstrained powertrain operation with respect to battery power.

4. The method for establishing an operating point for a preselected powertrain operating parameter as claimed in claim 2 wherein said transmission further includes a motor and a battery and said set of preferred operating points correspond to constrained powertrain operation with respect to battery power.

5. Method for establishing an operating point for a preselected powertrain operating parameter for a powertrain including an engine and a transmission including a motor and a battery, comprising:

providing a set of preferred operating points for said preselected powertrain operating parameter corresponding to unconstrained powertrain operation with respect to battery power, said set of preferred operating points being mapped to at least one additional powertrain operating parameter;

providing a desired operating point for said at least one additional powertrain operating parameter and referencing said set of preferred operating points with said desired operating point; and, establishing the operating point for said preselected powertrain operating parameter in accordance with referenced preferred operating points from said set of preferred operating points.

6. Method for establishing an operating point for a preselected powertrain operating parameter for a powertrain including an engine and a transmission including a motor and a battery, comprising:
providing a set of preferred operating points for said preselected powertrain operating parameter corresponding to constrained powertrain operation with respect to battery power, said set of preferred operating points being mapped to at least one additional powertrain operating parameter;
providing a desired operating point for said at least one additional powertrain operating parameter and referencing said set of preferred operating points with said desired operating point; and,
establishing the operating point for said preselected powertrain operating parameter in accordance with referenced preferred operating points from said set of preferred operating points.

7. Method for establishing an operating point for a first powertrain operating parameter for a powertrain including an engine and a transmission, comprising:
providing a first set of preferred operating points for said first powertrain operating parameter corresponding to unconstrained powertrain operation with respect to a second powertrain operating parameter, said first set of preferred operating points being mapped to at least one additional powertrain operating parameter;
providing a second set of preferred operating points for said first powertrain operating parameter corresponding to constrained powertrain operation with respect to the second powertrain operating parameter, said second set of preferred operating points being mapped to said at least one additional powertrain operating parameter;
providing a desired operating point for said at least one additional powertrain operating parameter and referencing said first and second sets of preferred operating points with said desired operating point; and,
establishing the operating point for said first powertrain operating parameter in accordance with referenced preferred operating points from said first and second sets of preferred operating points.

8. The method for establishing an operating point for a first powertrain operating parameter as claimed in claim 7 wherein said first powertrain operating parameter comprises transmission input speed and said at least one additional powertrain operating parameter is selected from the group consisting of transmission output speed and transmission output torque and combinations thereof.

9. The method for establishing an operating point for a first powertrain operating parameter as claimed in claim 8 wherein said transmission further includes a motor and a battery and said second powertrain operating parameter is battery power.

10. The method for establishing an operating point for a first powertrain operating parameter as claimed in claim 9 wherein said first and second sets of preferred operating points for said first powertrain operating parameter correspond to minimum aggregate powertrain losses for respective constrained and unconstrained powertrain operation with respect to the second powertrain operating parameter.

11. The method for establishing an operating point for a first powertrain operating parameter as claimed in claim 8 wherein said first and second sets of preferred operating points for said first powertrain operating parameter correspond to minimum aggregate powertrain losses for respective constrained and unconstrained powertrain operation with respect to the second powertrain operating parameter.

12. The method for establishing an operating point for a first powertrain operating parameter as claimed in claim 7 wherein said transmission further includes a motor and a battery and said second powertrain operating parameter is battery power.

13. The method for establishing an operating point for a first powertrain operating parameter as claimed in claim 7 wherein said first and second sets of preferred operating points for said first powertrain operating parameter correspond to minimum aggregate powertrain losses for respective constrained and unconstrained powertrain operation with respect to the second powertrain operating parameter.

14. Method for establishing an input operating point for use in control of a hybrid powertrain system including a hybrid transmission having an input coupled to an engine, an output, an electric motor and an electric battery, comprising:
defining an operating space for the powertrain in transmission input speed (Ni), transmission input torque (Ti), transmission output speed (No), and transmission output torque (To);
determining aggregate powertrain system power losses throughout said operating space;
determining first and second operating regions in Ni, No, To corresponding to minimum aggregate system power losses, said first operating region corresponding to system operation without battery power constraints and said second operating region corresponding to system operation with zero battery power, wherein Ni within said first and second operating regions represents preferred input operating points;
providing a desired operating point in No and To, and referencing said first and second operating regions therewith to obtain respective preferred input operating points in Ni; and,
establishing the input operating point in accordance with said respective operating points in Ni.

* * * * *